United States Patent [19]

Nogo

[11] Patent Number: 5,515,100
[45] Date of Patent: May 7, 1996

[54] SINGLE-UNIT VIDEO CAMERA-RECORDER WITH AUTOMATIC CONTROL OF POWER SUPPLY TO LIGHT RECEIVER

[75] Inventor: Yuichiro Nogo, Tokyo, Japan

[73] Assignee: Sony Corporation, Tokyo, Japan

[21] Appl. No.: 326,732

[22] Filed: Oct. 20, 1994

Related U.S. Application Data

[63] Continuation of Ser. No. 996,713, Dec. 24, 1992, abandoned.

[30] Foreign Application Priority Data

Dec. 26, 1991 [JP] Japan .................................. 3-357596
Apr. 9, 1992 [JP] Japan .................................. 4-116988

[51] Int. Cl.⁶ ...................................................... H04N 5/225
[52] U.S. Cl. ............................ 348/211; 348/373; 348/375
[58] Field of Search ..................................... 348/372, 373, 348/374, 375, 211; H04N 5/30, 5/225

[56] References Cited

U.S. PATENT DOCUMENTS

| | | | |
|---|---|---|---|
| 4,928,179 | 5/1990 | Takahashi et al. | 358/210 |
| 5,081,534 | 1/1992 | Geiger et al. | 358/194.1 |
| 5,109,284 | 4/1992 | Jung | 358/335 |
| 5,136,285 | 8/1992 | Okuyama | 340/870.110 |
| 5,151,727 | 9/1992 | Sasaki | 354/76 |
| 5,235,328 | 8/1993 | Kurita | 340/825.720 |

FOREIGN PATENT DOCUMENTS

| | | |
|---|---|---|
| 62-235880 | 10/1987 | Japan . |
| 63-107295 | 5/1988 | Japan . |
| 2153637 | 6/1990 | Japan . |
| 2170680 | 7/1990 | Japan . |
| 3133267 | 6/1991 | Japan . |
| 3265376 | 11/1991 | Japan . |
| 3286684 | 12/1991 | Japan . |
| 4103268 | 4/1992 | Japan . |
| 556320 | 3/1993 | Japan . |

Primary Examiner—Wendy R. Greening
Assistant Examiner—Ngoc-Yen Vu
Attorney, Agent, or Firm—Jay H. Maioli

[57] ABSTRACT

A light transmitting member is operatively fitted in a remote control light receiving unit for projection from and sinking in a VTR body. A power supply circuit for a light sensor is established when the remote control light receiving unit projects from the VTR body and an optical signal from a remote control device is detected by the light sensor, and the power supply circuit for the light sensor is interrupted when the remote control light receiving unit sinks in the VTR body. Further, the light transmitting member is adapted to cooperate with a locking/unlocking mechanism provided at its lower end portion to set up a reciprocating motion such that the remote control light receiving unit projects from and sinks in the VTR body. With the described arrangement, wasteful power consumption is cut and it is achieved for the remote control light receiving unit not to take in external noise by a simple operation of pushing the rod member in the VTR body when the remote control device is not used and, thus, effect of external noise is minimized.

6 Claims, 6 Drawing Sheets

SINGLE-UNIT VIDEO CAMERA-RECORDER WITH AUTOMATIC CONTROL OF POWER SUPPLY TO LIGHT RECEIVER

This is a continuation of application Ser. No. 07/996,713, filed Dec. 24, 1992, now abandoned.

BACKGROUND OF THE INVENTION

The present invention relates to a single-unit video camera-recorder, or a camera-VTR combination, and, more particularly, to a camera-VTR combination consuming low battery power and taking in the smallest possible external noise.

In such camera-VTR combinations (hereinafter also briefly referred to as "VTR"), there are those having a remote control light receiving unit incorporated in its body, which light receiving unit receives a remote control optical signal from, for example, a remote control device and transmits the optical signal to a light sensor.

Some of such VTRs have a light receiving window open to the outside.

When a VTR with the light receiving window open to the outside is used, power from a battery power source is constantly supplied to the light sensor. Otherwise, the power supply to the light sensor is started or interrupted by operating a dedicated switch for turning on/off power supply to the light sensor or by selecting an operating key.

In a VTR with the light receiving window open to the outside, since power from a battery power source is constantly supplied to the light sensor, the battery power is wastefully used and, hence, the battery has to be charged frequently.

On the other hand, in the use of a VTR whose light sensor is supplied with power by having the battery power source turned on/off, since users frequently forget to turn off the power for the light sensor after the use, there has been a problem that the power of battery is wasted and the battery has to be recharged.

Further, in the VTR of the described type, since an on-off switch for power supply to the light sensor and the like have to be installed on the body, there has been a difficulty in obtaining the space for installation of them from a limited area.

Besides, in the VTR of the described type, since the light receiving window is open to the outside at all times, there has been the risk that external disturbance light enters the VTR and thereby malfunctions of the VTR are produced.

Besides, in the VTR of the described type, since the on/off switch or operation key must be operated for power saving, there has been a demerit that the operability of the VTR is thereby lowered.

SUMMARY OF THE INVENTION

Accordingly, it is an object of the present invention to provide an arrangement for a VTR, without increasing size of the body of the VTR and its cost, in which a rod member is allowed to project from the VTR body only when a remote control device is used, whereby a power supply circuit for a light sensor is automatically established so that wasteful power consumption is curtailed, and when the remote control device is not used, the rod member is housed in the VTR body, to thereby prevent the VTR from taking in external noises, by such a simple operation as to push it down so that wasteful power consumption is curtailed.

In order to solve the above mentioned problems, the present invention comprises a remote control light receiving unit operatively arranged for projecting from and sinking in the VTR body and having a light receiving window for receiving an optical signal from an external remote control device to be transmitted to a light sensor and a light transmitting member, which is fitted in the remote control light receiving unit so as to be projected from or housed in the VTR body, and a switch operatively associated with the light transmitting member for establishing a power supply circuit for the light sensor when the remote control light receiving unit projects from the VTR body and interrupting the power supply circuit for the light sensor when the remote control light receiving unit sinks in the VTR body.

The present invention further embraces an arrangement in which the light transmitting member is fitted in the remote control light receiving unit so as to direct the light received by the remote control light receiving unit through the light receiving window to the light sensor.

The remote control light receiving unit, operatively arranged for projecting from and sinking in the VTR body, receives an optical signal from an external remote control device and transmits it to a light sensor.

The remote control light receiving unit, operatively associated with the light transmitting member fitted therein so as to be projected from and housed in the VTR body, establishes the power supply circuit for the light sensor upon its projecting from the VTR body and interrupts the power supply circuit for the light sensor by opening the switch upon its sinking in the VTR body.

Accordingly, the power supply circuit for the light sensor is closed only when the remote control device is used to save battery power consumption.

Further, the light transmitting member is fitted in the remote control light receiving unit so that the received light from the light receiving window is deflected by for example a prism portion of it located at the light receiving window to enter the light sensor thereunder and, hence, it is ensured that the optical signal from the remote control device is detected by the light sensor.

DETAILED DESCRIPTION OF THE PREFERRED EMBODIMENTS

The present invention will be described in more detail as related to a preferred embodiment shown in the accompanying drawings.

Figure 1:
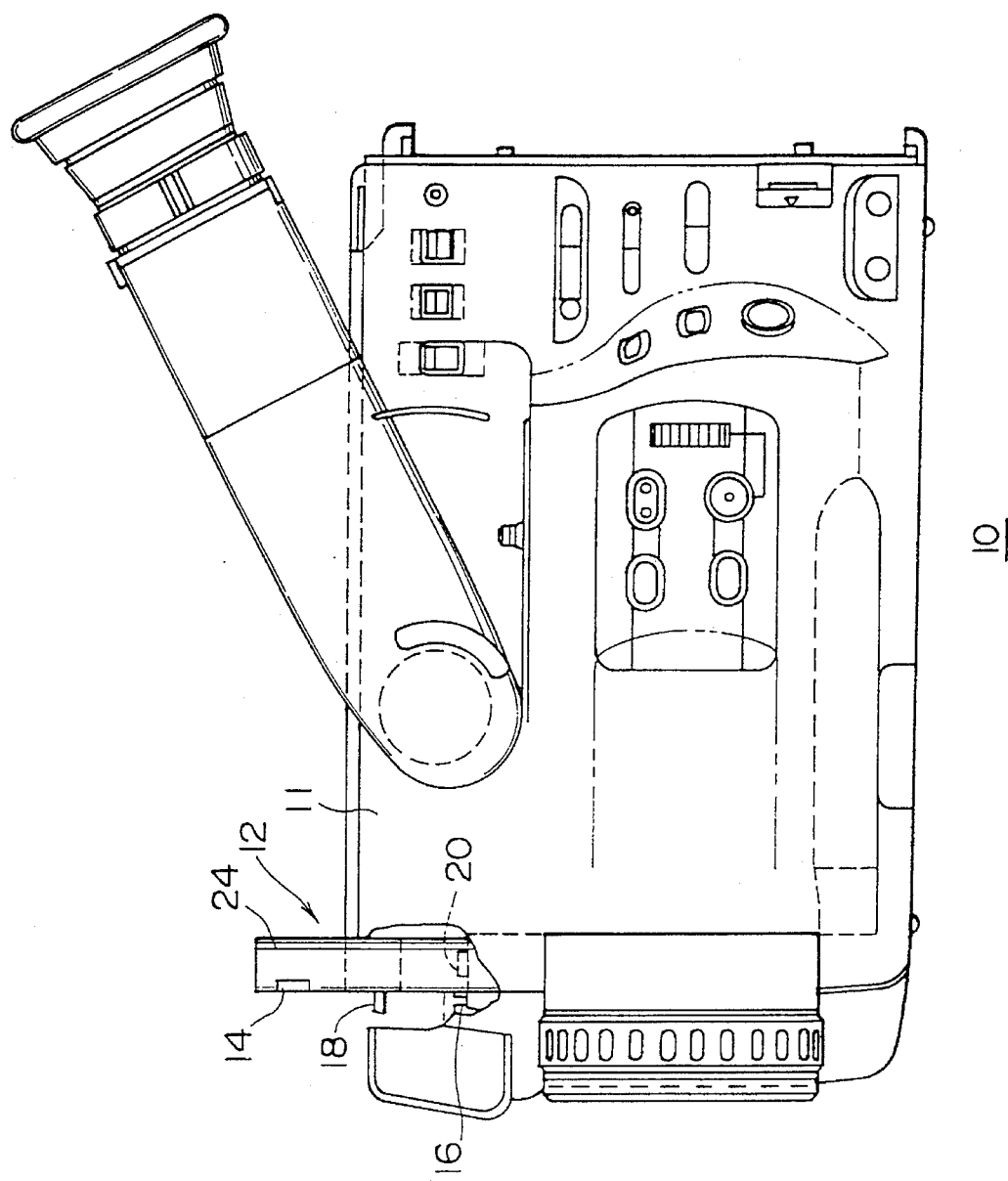
FIG. 1 is a side view of a camera-VTR combination according to an embodiment of the present invention.
Figure 2:
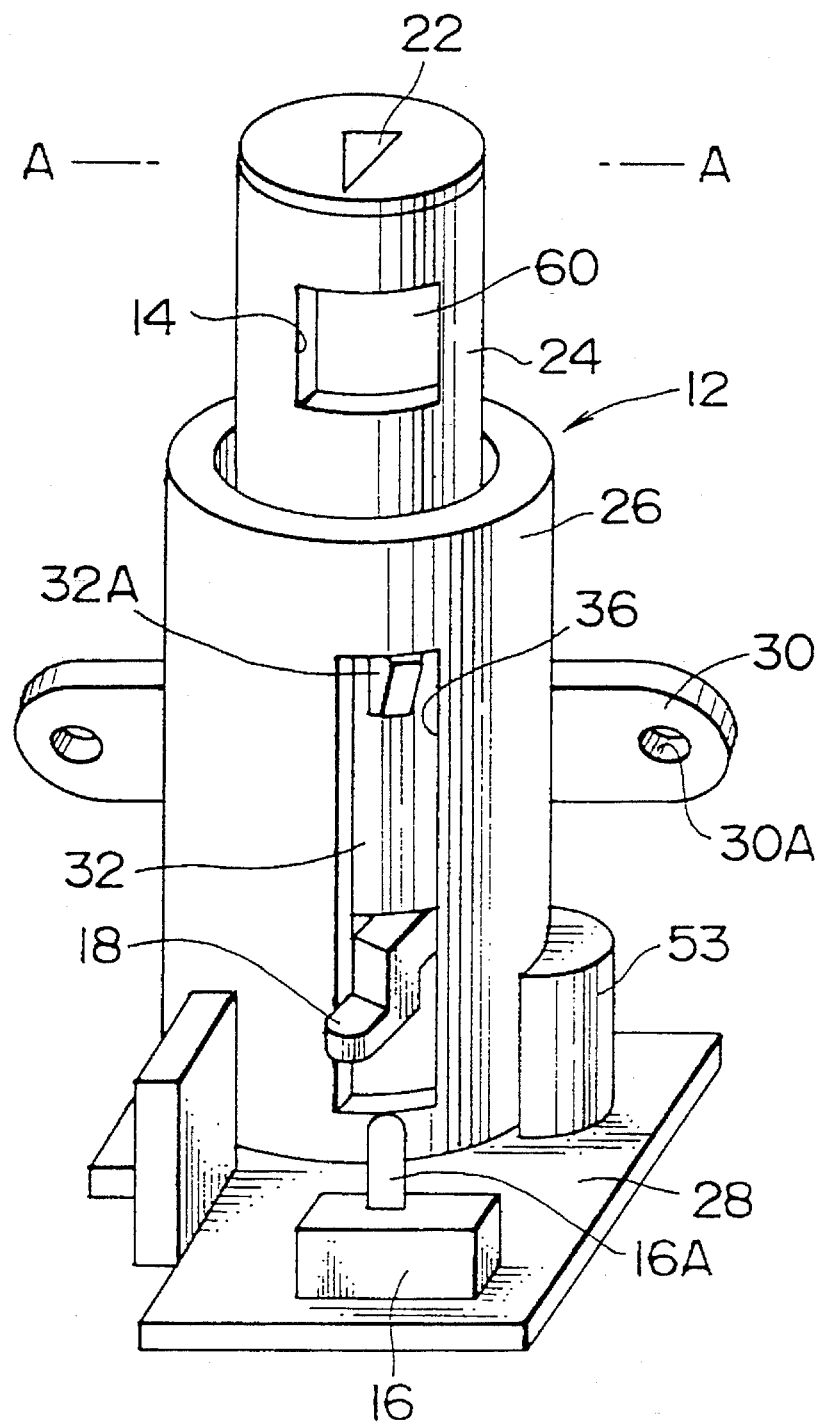
FIG. 2 is a perspective view of a remote control light receiving unit according to an embodiment of the present invention.
Figure 3:
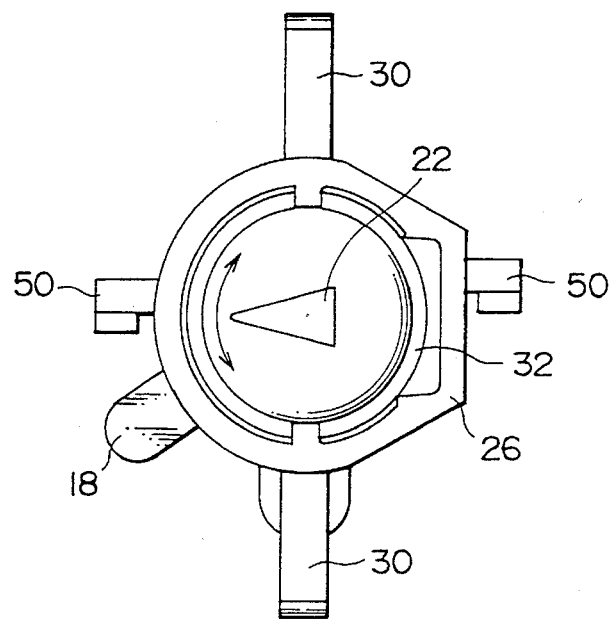
FIG. 3 is a plan view showing a remote control light receiving unit according to an embodiment of the present invention.
Figure 4:
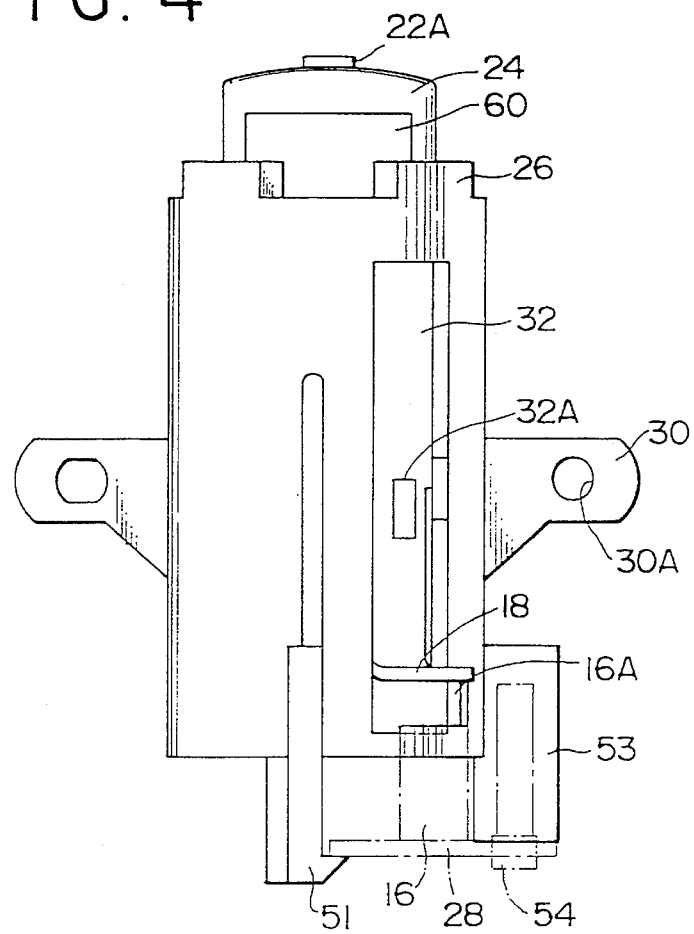
FIG. 4 is a side view showing a remote control light receiving unit according to an embodiment of the present invention.

FIG. 1 is a side view showing a remote control light receiving unit applied to an embodiment of a camera-VTR combination according to the present invention. FIG. 2 is a perspective view showing an embodiment of the remote control light receiving unit shown in FIG. 1, FIG. 3 is a plan view showing an embodiment of the remote control light receiving unit shown in FIG. 1, FIG. 4 and FIG. 5 are side views showing an embodiment of the remote control light receiving unit shown in FIG. 1, and FIG. 6 to FIG. 9 are sectional views of the remote control light receiving unit shown in FIG. 1.

Referring to the drawings, there is erected a remote control light receiving unit 12 at the above left of the body 11 of the camera-VTR combination 10.

FIG. 2 shows an enlarged view of the remote control light receiving unit 12.

Figure 5:
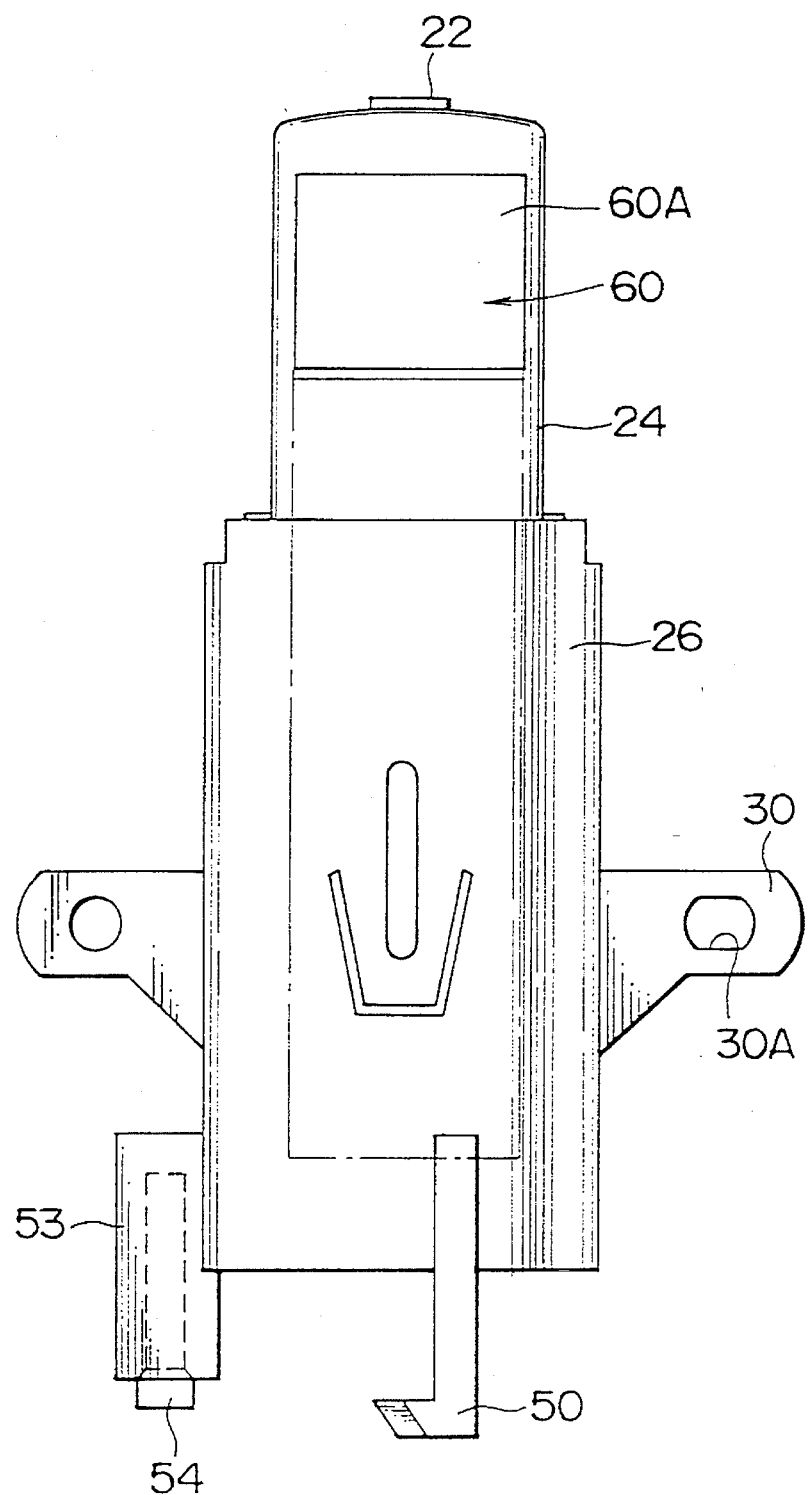
FIG. 5 is a side view showing a remote control light receiving unit according to an embodiment of the present invention.
Figure 6:
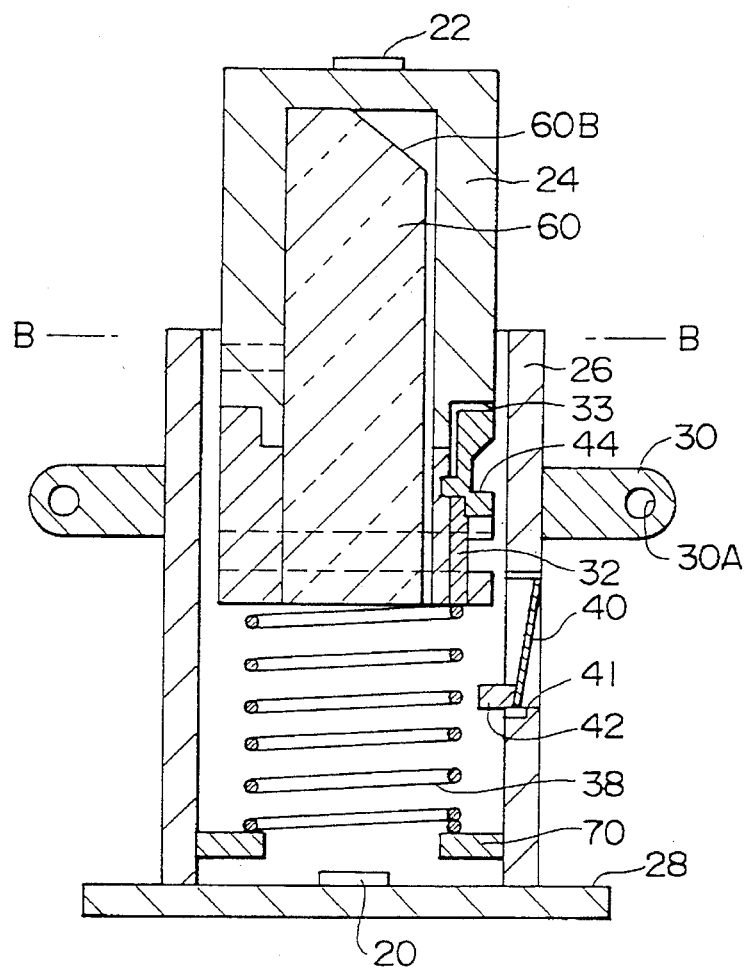
FIG. 6 is a longitudinal sectional view of a remote control light receiving unit in the state where a remote control device is used.
Figure 8:
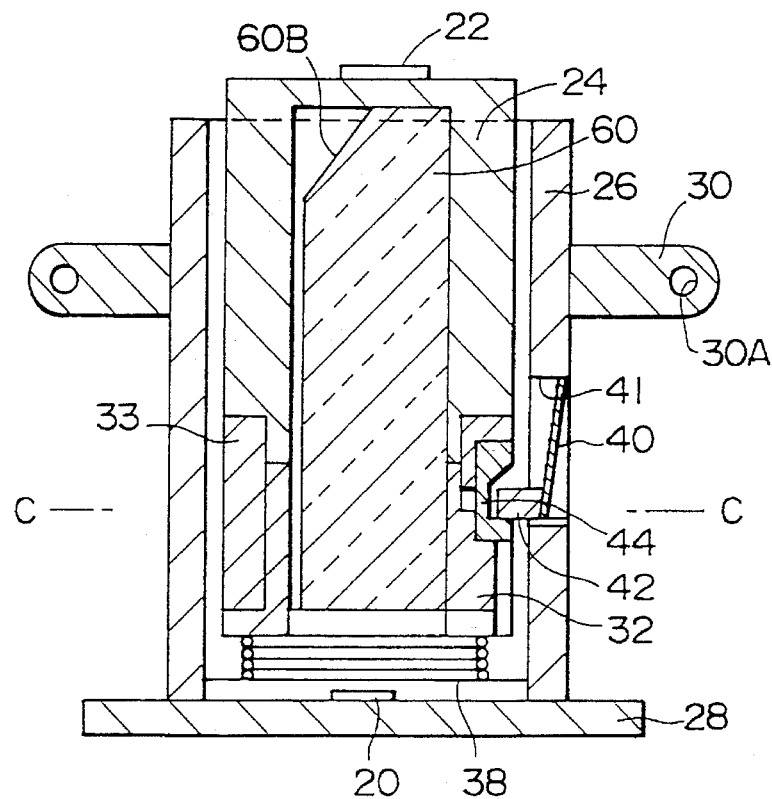
FIG. 8 is a longitudinal sectional view of a remote control light receiving unit in the state where the use of the remote control device is finished.

In the remote control light receiving unit 12, there is provided a light transmitting member 60 in the form of a rod made of glass or transparent plastic having its end cut through a face 60B at an angle with the plane of incidence 60A, such that a prism is formed at the end, and being set in a cylindrical movable holder 24 as shown in FIG. 5, FIG. 6, and FIG. 8. The movable holder 24 is integrally formed of two setting pieces to facilitate the setting of the light transmitting member 60 therein and it has a light receiving window opened at one side of its upper end.

The setting pieces of the movable holder 24 are fitted over the prism portion of the light transmitting member 60 such that the plane of incidence 60A of the prism portion at the end of the light transmitting member 60 looks out through the light receiving window 14.

Light transmitted from a remote control device and let in through the light receiving window 14 at one side of the upper end of the movable holder 24 is introduced, through the prism portion of the light transmitting member 60, to a light sensor 20 provided under the light transmitting member 60 as shown in FIG. 6 to FIG. 9.

The lower end portion of the movable holder 24 is rotatably set in a ring member 32.

At the lower end of the ring member 32, there is provided a projected piece 18 integrally formed with the ring member 32 as shown in FIG. 1 to FIG. 4, FIG. 7 and FIG. 9.

When the projected piece 18 descends, it depresses a switch 16 to thereby cut off a power supply circuit for the light sensor.

When the projected piece 18 ascends, it releases the push on a contact 16A of the switch 16.

Thereby, a spring provided within the contact portion 16A of the switch 16 rises.

On the ring member 32, there is provided an engagement portion 32A as shown in FIG. 2 and FIG. 4, and the ascent of the movable holder 24 is controlled by a slot 36 made in a fixed cylinder 26 and the engagement portion 32A.

At the lower end of the fixed cylinder 26, there are provided leg portions 50 and 51 in the form of a claw piece as shown in FIG. 3 to FIG. 5 and a base plate 28 is mounted on the leg portions as indicated by chain lines in FIG. 4.

A screwed leg portion 53 is integrally formed with the fixed cylinder 26 as shown in FIG. 2, FIG. 4, and FIG. 5, and the base plate 28 and the fixed cylinder 26 are fixed together by fastening a screw 54 inserted in the screwed leg portion 53 from the back side of the base plate 28.

On the base plate 28, there are mounted the contact portion 16A of the power interrupting switch 16, which turns off the switch by being pushed by the projected piece 18 of the ring member 32 when it descends and a transistor (not shown) for switching, as well as the light sensor 20, shown in FIG. 6 to FIG. 9, which is positioned just under the light transmitting member 60.

The fixed cylinder 26 further has protruded members 30 integrally formed therewith for fixing the fixed cylinder 26 to the VTR body 11.

The protruded member 30 has a screw hole 30A and the fixed cylinder 26 is fixed to the VTR body 11 by means of a screw inserted in the screw hole 30A.

The movable holder 24 is arranged, at the time when the remote control device is used, to be pulled upward from the fixed cylinder 26 such that the light receiving window 14 projects from the top of the VTR body 11, while, at the time when the remote control device is not used, it is pushed down, such that the light receiving window 14 hides behind the VTR body 11.

When the movable holder 24 is projected from the fixed cylinder 26, the projected piece 18 at the bottom of the movable holder 24 shown in FIG. 2, FIG. 4, FIG. 7, and FIG. 9 is separated from the contact portion 16A of the small-sized switch 16 provided within the VTR, shown in FIG. 2 and FIG. 4, whereby the power interrupting switch 16 is closed (to make an off operation) and the power supply circuit for the light sensor is established.

On the other hand, when the movable holder 24 is housed in the fixed cylinder 26, the ring member 32 is pushed down and the projected piece 18 comes in contact with the contact portion 16A of the power interrupting switch 16 to push it down, whereby the power interrupting switch 16 is opened (to make an on operation) and the power supply circuit for the light sensor is interrupted.

On the top face of the movable holder 24, there is provided a protruded arrow mark 22 indicating the direction of the light receiving window 14, shown in FIG. 2 to FIG. 6 and FIG. 8, formed integrally with the movable holder 24.

The movable holder 24 is adapted to be suitably rotated such that the arrow mark 22 is simply adjusted to the direction in which the remote control transmitter (not shown) can easily transmits its signal and, thereby, the remote control light information is easily let in through the light receiving window 14.

Since the entering light through the light receiving window 14 is adapted to be deflected a right angle by the prism portion at the top of the light transmitting member 60, it is ensured that the entering light through the light receiving window 14 is detected by the light sensor 20.

A pop-up mechanism of the remote control light receiving unit 12 will be described below referring to FIG. 6 to FIG. 9.

Figure 7:
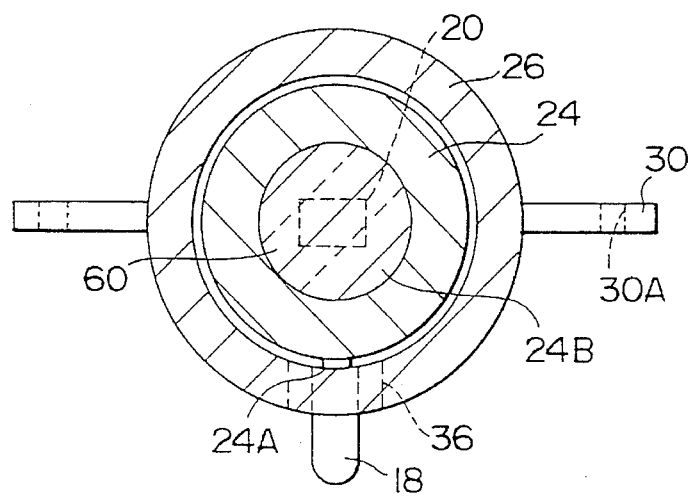
FIG. 7 is a cross-sectional view taken along line B—B of FIG. 6.

FIG. 6 is a longitudinal sectional view of the remote control light receiving unit 12 with the movable holder 24 upwardly projected from the fixed cylinder 26 and FIG. 7 is a cross-sectional view taken along line B—B of FIG. 6.

Figure 9:
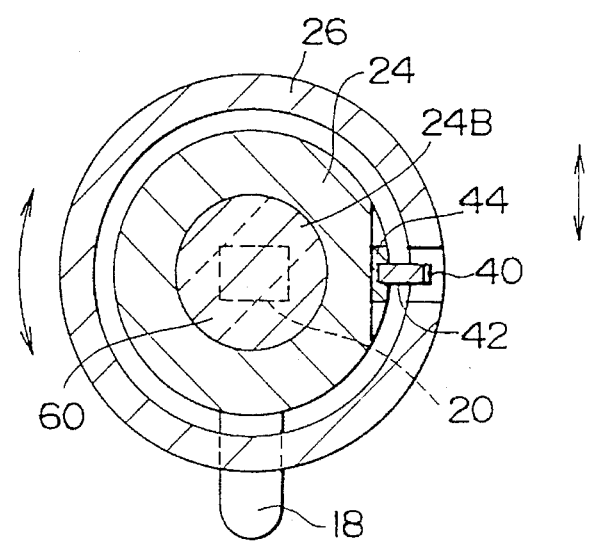
FIG. 9 is a cross-sectional view taken along line C—C of FIG. 8.

FIG. 8 is a longitudinal sectional view of the remote control light receiving unit 12 with the movable holder 24 housed in the fixed cylinder 26 and FIG. 9 is a cross-sectional view taken along line C—C of FIG. 8.

In the following description FIG. 1 to FIG. 5 will also be referred to.

Between the bottom face of the movable holder 24 and a spring mounting plate 70 of the fixed cylinder 26, there is inserted a spring 38 with a specific spring constant.

The spring 38 urges the movable holder 24 upward at all times.

The fixed cylinder 26 has the slot 36 cut in its peripheral wall to limit the height of the movable holder 24 to a predetermined level relative to the fixed cylinder 26 against the urging force of the spring 38.

More specifically, the engagement portion 32A of the ring member 32 comes into contact with the top end of the slot 36 and, thereby, the ascent of the movable holder 24 is controlled.

The movable holder 24 is fitted to the ring member 32, which is provided with the projected piece 18 as shown in FIG. 2, for rotation in an annular space 33 formed between the ring member 32 and the body of the movable holder 24.

At a predetermined position of the fixed cylinder 26, there is formed a hole 41, and in this hole 41 is provided a mold spring 40 having an engagement portion 42.

The ring member 32 is provided with a member 44 having a cut recess therein at a predetermined position where the ring member 32 is allowed to engage with the projected portion 42 when the movable holder 24 is lowered to its housed position.

The member 44 is arranged to be slidable, as indicated by an arrow in FIG. 9, in the direction up and down in the drawing. Further, the member 44 is provided with a cam and, thereby, the ascending and descending motions of the ring member 32 are locked and unlocked.

If the user, after finishing the remote controlling operation, pushes down the movable holder 24 from its position shown in FIG. 6 against the urging force of the spring 38, then, the movable holder 24 while descending pushes out the projected portion 42 of the fixed cylinder 26 toward the fixed cylinder 26 with the member 44 attached to the periphery of the ring member 32.

When the movable holder 24 descends a predetermined distance, the projected portion 42 is pushed into the cut recess 44 by the action of the mold spring 40 to engage with it and, thereby, the movable holder 24 is held in this position. This state is shown in FIG. 8 and FIG. 9.

In the descent of the movable holder 24, it descends together with the ring member 32 with its projected portion 18 sliding along the slot 36 shown in FIG. 2 by means of an unlocking mechanism as described below in detail.

At this time, the power interrupting switch 16 shown in FIG. 2 is depressed by the projected portion 18 and, thereby, power supply from a power source (not shown) through the remote control light receiving unit 12 is interrupted.

Since the light receiving window 14 is hidden when the movable holder 24 is housed in the fixed cylinder 26, the light sensor 20 is prevented from responding to any external unrelated optical signals.

Therefore, even if an optical signal gets in, it has no effect on the VTR because the supply of power from the power source (not shown) is interrupted by the remote control light receiving unit 12. Thus, double preventive measures of malfunction are taken.

To allow the movable holder 24 to ascend again and change from the state shown in FIG. 8 to that shown in FIG. 6, the movable holder 24 is further lowered. Since the member having the cut recess 44 is so arranged as to slide on the ring member 32 when the movable holder 24 is further lowered as shown in FIG. 8, the projected portion 42 is disengaged from the member having the cut recess 44 attached to the ring member 32 and, as a result, the movable holder 24 is allowed to ascend by the urging force of the spring 38.

In the embodiment of the remote control light receiving unit described above, the remote control light receiving unit 12 is arranged to project from or to sink in the VTR body 11. When the remote control light receiving unit 12 projects, a power supply circuit for the light sensor is established in order that an optical signal from the remote control device may be detected by the light sensor 20, and when the rod member sinks in the VTR body 11, the power supply circuit for the light sensor is interrupted.

According to the above described embodiment, the remote control light receiving unit 12 is allowed to project from the VTR body 11 and establish the power supply circuit (not shown) only when the remote control device is used without the need for a power on/off switch to thereby curtail wasteful power consumption. When the remote control device is not used, the remote control light receiving unit 12 sinks in the VTR body 11 by a simple operation of pushing it down and it is thereby achieved that external noise is prevented from getting in and the effect of the external noise is reduced to the lowest possible level.

Further, since the rod member is adapted to project from and sink in the VTR body 11 not requiring any special space by providing a member having the cut recess on a ring member so that the rod member cooperates with the member to make a reciprocating motion, the remote control light receiving unit 12 can be easily operated without using any other switches or the like.

Besides, by having a light transmitting member 60 adapted to allow the light received from the light receiving window 14 to deflect a right angle at its prism portion and straightly propagate therethrough fitted in the rod member, it is ensured that the remote controlling optical signal is detected by the light sensor 20.

According to the present invention as described above, the operation of the small-sized switch incorporated in the VTR body is operatively associated with the remote control light receiving unit with a light receiving window provided therein when it is in motion to project from and sink in the VTR body. Accordingly, the power supply from the power source for receiving the remote controlling signal is automatically interrupted when the use of the remote control device is finished without the need for a dedicated switch and, hence, extra consumption of electric power can be prevented.

According to the present invention, when the remote control device is not used, the remote control light receiving unit sinks in the VTR body and, hence, any optical signal is prevented from getting in. Besides, the power supply circuit for the light sensor is interrupted and this state of power interruption can be kept up. Thus, the power supply circuit is doubly prevented from making a malfunction.

What is claimed is:

1. An electronic apparatus controlled by an external remote control device comprising:

an apparatus body including a stationary surface;

means for receiving light from said remote control device, said light-receiving means including a holder movable in a first direction and a second direction and defining a directional light-receiving window, a light-transmitting member attached to said movable holder and movable therewith for transmitting light passing through said light-receiving window, and a light sensor attached to the stationary surface of the apparatus body for sensing light transmitted by said light-transmitting member, the second direction being a direction of rotation about an axis parallel to said first direction;

means for allowing said movable holder to move in the first direction to selectively project from and sink in the body of said electronic apparatus, said light sensor remaining always in said body; and means for interrupting a supply of power to said light-receiving means in response to sinking of said movable holder in the body of said electronic apparatus.

2. A camera-VTR combination controlled by an external remote control device comprising:

an apparatus body including a stationary surface;

means for receiving light from said remote control device, said light-receiving means including holder movable in a first direction and a second direction and defining a directional light-receiving window, a light-transmitting member attached to said movable holder and movable therewith for transmitting light passing through said light-receiving window, and a light sensor attached to the stationary surface of the apparatus body for sensing light transmitted by said light-transmitting member, the second direction being a direction of rotation about an axis parallel to said first direction;

means for allowing said movable holder to move in the first direction to selectively project from and sink in the body of said camera-VTR combination, said light sensor remaining always in said body; and means for interrupting a supply of power to said light-receiving means in response to sinking of said movable holder in the body of said camera-VTR combination.

3. A camera-VTR combination according to claim 2 wherein said movable holder is mounted on the top face of said camera-VTR combination.

4. A camera-VTR combination according to claim 3 wherein said movable holder is urged by a spring at all times in the direction in which said movable holder projects from said body.

5. A camera-VTR combination according to claim 4 wherein said means for allowing said movable holder to project and sink in said first direction includes locking means for holding said movable holder in a state where said movable holder has sunk in the body of said camera-VTR combination.

6. A camera-VTR combination according to claim 5 wherein said light sensor is disposed directly under said light-transmitting member.

* * * * *